US011811720B2

(12) United States Patent
Ranpise et al.

(10) Patent No.: US 11,811,720 B2
(45) Date of Patent: *Nov. 7, 2023

(54) EFFICIENT ARP PACKET PROPAGATION

(71) Applicant: Arista Networks, Inc., Santa Clara, CA (US)

(72) Inventors: Amit Dattatray Ranpise, San Jose, CA (US); Kamlesh Raghuvanshi, Saratoga, CA (US); Kallol Mandal, Sausalito, CA (US); Rajesh Kumar Semwal, Sunnyvale, CA (US); Alton Lo, Fremont, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,419

(22) Filed: Feb. 4, 2022

(65) Prior Publication Data
US 2022/0231986 A1 Jul. 21, 2022

Related U.S. Application Data

(63) Continuation of application No. 16/749,846, filed on Jan. 22, 2020, now Pat. No. 11,252,125.

(51) Int. Cl.
H04L 61/103 (2022.01)
G06F 9/54 (2006.01)
(Continued)

(52) U.S. Cl.
CPC ............ H04L 61/103 (2013.01); G06F 9/546 (2013.01); H04L 12/4641 (2013.01); H04L 45/745 (2013.01); H04L 2101/622 (2022.05)

(58) Field of Classification Search
CPC .. H04W 76/10; H04W 72/12; H04L 61/2528; H04L 61/6068; H04L 45/68; H04L 61/2514; H04L 29/12; H04L 12/721
See application file for complete search history.

(56) References Cited

U.S. PATENT DOCUMENTS 7,327,722 B1 * 2/2008 Pipher ................. H04L 12/5601
370/352
8,250,189 B1 8/2012 Breau et al.
(Continued)

OTHER PUBLICATIONS

Sajassi et al., RFC 7432 BGP MPLS-Based Ethernet VPN, Feb. 2015 (56 pages).

(Continued)

*Primary Examiner* — Iqbal Zaidi
(74) *Attorney, Agent, or Firm* — Fountainhead Law Group P.C.

(57) ABSTRACT

Techniques disclosed herein provide a method for efficiently propagating address resolution reply messages. A first router in a first network receives an address resolution request message from a second router in a second network. The first router generates an entry for the address resolution request message and stores the entry in a pending address resolution requests table. When the first router receives a route advertisement, it extracts a network layer address from the route advertisement and determines whether the pending address resolution requests table includes an entry for the network layer address. If so, the router extracts a link layer address from the route advertisement and generates an address resolution reply message comprising the network layer address and the link layer address. The router then transmits the address resolution reply message to the second router.

20 Claims, 9 Drawing Sheets

(51) Int. Cl.
    *H04L 45/745*     (2022.01)
    *H04L 12/46*     (2006.01)
    *H04L 101/622*     (2022.01)

(56) References Cited

U.S. PATENT DOCUMENTS

2007/0121656 A1     5/2007   Heidari-Bateni
2021/0226912 A1     7/2021   Ranpise et al.

OTHER PUBLICATIONS

Sajassi et al., E-VPN Ethernet Segment Route, draft-sajassi-l2vpn-segment-route-00.txt, Jul. 4, 2011 (13 pages).
User Manual, EVPN Overview Chapter 23 (130 pages) https://www.arista.com/assets/data/pdf/user-manual/um-eos/Chapters/EVPN.pdf.
VXLAN Data Center Interconnect Using EVPN, Overview, Jun. 24, 2019 (19 pages).

* cited by examiner

| Target IP Address | Source IP Address | Source MAC Address | Ingress L2 DCI | Ethernet header 801.1Q tag |
|---|---|---|---|---|
| 20.0.0.21 | 10.0.0.21 | 00:0a:95:9d:68:16 | DCI Link ID 1 | Including (VNI1) |
| 20.0.0.21 | 10.0.0.31 | 00:bc:13:25:15:11 | DCI Link ID 1 | Including (VNI1) |
| 20.0.0.41 | 30.0.0.41 | 00:13:a1:b3:35:01 | DCI Link ID 2 | Including (VNI3) |
| 20.0.0.31 | 30.0.0.51 | 00:aa:12:bb:ca:22 | DCI Link ID 2 | Including (VNI3) |

EFFICIENT ARP PACKET PROPAGATION

CROSS-REFERENCE TO RELATED APPLICATIONS

This application is a continuation of U.S. patent application Ser. No. 16/749,846, filed Jan. 22, 2020, now issued as U.S. Pat. No. 11,252,125, the disclosure of which is hereby incorporated by reference herein for all purposes.

BACKGROUND

The present disclosure relates to efficient propagation of Address Resolution Protocol (ARP) packets across several datacenters. In particular, the disclosure related to tracking address resolution request received via datacenter interconnect links, and using the tracked request to efficiently process route advertisement matching the address resolution request.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which:

FIG. 4 shows a diagram of an illustrative address resolution table, in accordance with some embodiments of the present disclosure;

DETAILED DESCRIPTION

Figure 1:
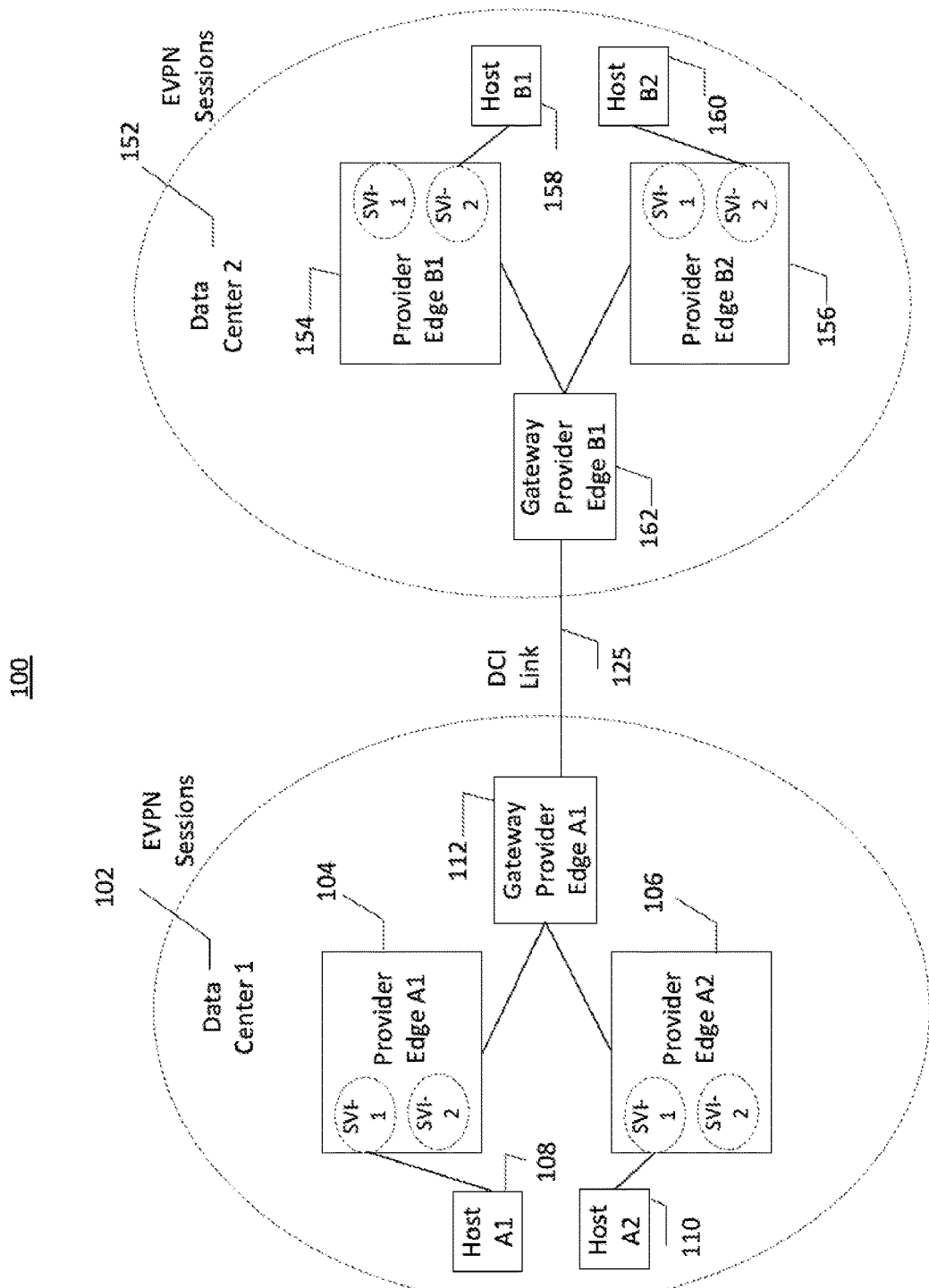
FIG. 1 shows an illustrative network topology of a system for propagation of an ARP entries across data centers, in accordance with some embodiments of the disclosure.

In some computer networks, interconnected data centers operate internal ethernet virtual private network (EVPN) sessions between devices in each respective data center. In such configurations, the data centers have layer 2 (L2) connectivity between each other, but do not have layer 3 (L3) connectivity outside of each individual data center. Each data center includes a gateway router via which all inter-data center traffic flows. The gateway router may be a provider edge (PE) device configured as a virtual extensible local area network (VXLAN) tunnel endpoint (VTEP). The data centers further include additional routers connected to the various hosts in the data center network. The gateway and other routers each have virtual network interfaces (sometimes referred to as switch virtual interfaces (SVIs)) dedicated to each of the interconnected data centers' subnets. For example, in configurations where two data centers are interconnected, each router in both of the data centers will be configured with two SVIs, one dedicated to the subnet of one data center, and one dedicated to the subnet of the other data center. The SVIs dedicated to a particular subnet all share the same virtual internet protocol (IP) address and virtual media access control (MAC) address and operate as a gateway for that subnet.

When a source host in one data center wants to communicate with a destination host in another data center, the source host sends a data packet to its gateway. For example, the source host sends the data packet to its directly connected router, which is configured with an SVI dedicated to the subnet of the source host. The data packet includes, as its destination IP address, the IP address of the destination host. When the router receives the data packet, the router forwards the data packet into the subnet of the destination host and determines whether an address resolution table includes an entry (e.g., an IP-to-MAC binding) for the destination IP address (the IP address of the destination host). If the address resolution table does not include an entry for the destination IP address, the router generates an address resolution request message. The address resolution request message may be an address resolution protocol (ARP) request message or a neighbor discovery protocol (NDP) neighbor solicitation message. The address resolution request message includes, as its destination IP address, the IP address of the destination host. It also includes, as its source IP address and MAC address, the virtual IP address and virtual MAC address shared by the SVIs dedicated to the subnet of the destination host. The router then broadcasts the address resolution request message to each router and host to which it is connected. The address resolution message may be encapsulated in a VXLAN or multiprotocol label switching (MPLS) header and thus transmitted, within the data center, via a VXLAN or multiprotocol label switching MPLS tunnel.

Routers that receive the address resolution request message will decapsulate the message and propagate the message to all the routers and hosts to which they are connected. When the gateway router of the data center of the source host receives the address resolution request message, the gateway router propagates the address resolution request message to the gateway router of the data center of the destination host. The address resolution request message is then further propagated by routers in the data center of the destination host until the address resolution request message reaches either (i) the destination host or (ii) a router that has an entry for the destination IP address in its address resolution table and is configured to operate as an address resolution proxy.

When the destination host or the proxy router configured as an address resolution proxy receives the address resolution request message, the destination host or proxy router generates an address resolution reply message. The address resolution reply message may be an ARP reply message or an NDP neighbor advertisement message. The address resolution reply message includes, as its source IP and MAC addresses, the IP and MAC addresses of the destination host. It also includes, as its destination IP and MAC addresses, the source IP and MAC addresses included in the address resolution request message. In this case, the source IP and MAC addresses included in the address resolution request message are the virtual IP address and virtual MAC address shared by the SVIs dedicated to the subnet of the destination host. The destination host or proxy router then transmits the address resolution reply message back to the router from which it received the address resolution request message. The router receiving the address resolution reply message from the destination host or proxy router will "consume" the address resolution reply message. This happens because that router, along with the other routers in both data centers, is configured with an SVI that has the destination IP and MAC addresses included in the address resolution reply message. The receiving router will then store the IP-to-MAC binding of the destination host in its address resolution table, and generate a route advertisement (e.g., an EVPN update message) advertising a path to the destination host. The receiving router then transmits the route advertisement to all the routers with which it maintains an EVPN session (i.e., all the routers in the data center of the destination host). The receiving router will not transmit the route advertisement to routers outside of its data center because it only maintains an EVPN session with routers within its data center. Thus, neither the address resolution reply message nor the route advertisement for the destination host will be sent to the data center of the source host and will thus never reach the router that generated the address resolution request message.

Some methods for addressing this problem involve configuring routers to broadcast all address resolution reply messages the same as they would for address resolution request messages instead of transmitting the address resolution reply messages to only its destination. Thus, all routers and hosts in all interconnected data centers will receive all address resolution reply messages. These methods are very inefficient and cause significant unnecessary data traffic on the network and wastage of network resources, and further results in all routers in all of the interconnected data centers generating address resolution table entries for every host in the data centers.

Various systems and methods described herein address these problems by configuring gateway routers (i.e., the routers via which inter-data center traffic flows) to maintain a pending address resolution requests table. The gateway routers then generate entries in the pending address resolution requests table for address resolution request messages they receive from outside their own data center, for example, via a data center interconnect (DCI) link with another data center. The entries include the destination IP address included in the address resolution request message, the source IP and MAC addresses included in the address resolution request message, an identifier of the DCI link via which the address resolution message was received, and a virtual local area network (VLAN) tag of the network of the data center of the source host. The gateway routers are further configured to determine, when receiving a route advertisement, whether an IP address included in the route advertisement matches an IP address in an entry in the pending address resolution requests table. If the IP address included in the route advertisement matches an IP address in an entry in the pending address resolution requests table, the gateway router generates an address resolution reply message. The address resolution reply message will include, as its source IP and MAC addresses, the IP and MAC addresses included in the route advertisement, and as its destination IP and MAC addresses, the source IP and MAC addresses of the address resolution request message. In this case, the source IP and MAC addresses of the address resolution request message are the virtual IP and virtual MAC addresses of the SVIs dedicated to the subnet of the destination host. The gateway router then transmits the address resolution reply message to the router on the other end of the DCI link via which the address resolution request message was received. The gateway router then deletes the entry from the pending address resolution requests table.

When the router on the other end of the DCI link receives the address resolution reply message, that router "consumes" the address resolution reply message because it is configured with an SVI that has the destination IP and MAC addresses included in the address resolution reply message. The router will then store the IP-to-MAC binding of the destination host in its address resolution table and generate a route advertisement advertising a path to the destination host. The router then transmits the route advertisement to all the routers with which it maintains an EVPN session—in this case, all the routers in the data center of the source host. The route advertisement will thus be sent to the router that generated the address resolution request message, which will store the IP-to-MAC binding for the destination host in its address resolution table, and then forward the data packet received from the source host to the destination host. In some embodiments, there may be multiple outstanding address resolution requests for a particular IP address. In such embodiments, the pending address resolution requests table may include multiple entries for the same IP address, or the entry for the IP address may include a list of values, each item in the list including source IP and MAC addresses included in an address resolution request message for the particular IP address, an identifier of the DCI link via which that address resolution message was received, and a virtual local area network (VLAN) tag of the network of the data center from which that address resolution request message was received.

When the gateway router receives a route advertisement including that IP address, the gateway router will generate address resolution reply messages for each of the pending requests for the IP.

The entries in the pending address resolution requests table may have a predetermined validity period and may be deleted when that period expires. For example, if an address resolution request message is received by a gateway router, the gateway router generates an entry for that request in its pending address resolution requests table. If the gateway router does not receive a route advertisement including the IP address included in the address resolution request message within a predetermined time, the entry will expire and be deleted. Because the address resolution request message will be broadcast to all of the interconnected data centers, gateway routers of the data centers that do not include the destination host will receive the address resolution request message and generate an entry in their pending address resolution requests table for the requested IP address. Those entries will eventually expire when a route advertisement having the requested IP address is not received, and thus the pending address resolution requests table will not indefinitely maintain entries for address resolution request messages that are destined for hosts in other data centers.

FIG. 1 shows an illustrative diagram of system 100 for propagating address resolution request message (e.g., an ARP reply message). System 100 is shown as having two data centers 102 and 152, but any numbers of data centers may be connected in this way. As shown, data centers 102 and 152 may be connected by data center interconnect (DCI) link 125 (e.g., Layer 2 DCI trunk port). In some embodiments, each of data centers 102 and 152 may have an Ethernet Virtual Private Network (EVPN) configured for all devices (hosts and provider edges) within each respective data center. As shown, packets may traverse between data centers 102 and 152 in virtual ethernet frames with Virtual Local Area Network (VLAN) tag, and without any tunnel header on L2 DCI link 125.

EVPN sessions may be provisioned for each data center 102 and 152 independently of each other. For example, all the hosts (e.g., hosts 108, and 110), provider edge (PE) devices (e.g., edge devices 104 and 106) and gateway provider edge (GW PE) devices (e.g., GW provider edge device 112) of data center 102 may be interconnected to each other in a first EVPN control plane. Similarly, all the hosts (e.g., hosts 158 and 160), all the provider edge devices (e.g., provider edge devices 154 and 156) and gateway provider edge devices (e.g., GW provider edge device 162) of data center 152 may be interconnected to each other in a second EVPN control plane. In one implementation, EVPN session is not maintained between devices in data center 102 and in devices data center 152.

Such a topology of system 100 has an advantage in that the PE devices in data center 102 do not maintain MAC address of any hosts (e.g., hosts 158, 160) from data center 152 unless there is a cross data center communication required between a host in data center 102 with a host from data center 152. Another advantage is that the EVPN domain stays small and Layer 3 reachability of the PE devices (e.g., devices 104, 106) stays contained within data center 102.

In some embodiments, links between hosts, PE devices, and GW devices may be an overlay of virtual links configured over an underlay of physical devices. In some embodiments, the underlay may be a mesh of devices. In some embodiments, hosts 108, 110, 158, and 160 may be virtual hosts controlled by a hypervisor.

In such a topology as system 100, host 108 may desire to communicate with host 158. In some embodiments, PE devices 104, 106, 154, and 156 may be configured with one or more L3 ports (e.g., Switched Virtual Interfaces (SVIs)) each port having an overlay of anycast (e.g., virtual) gateway IP address and virtual MAC address. For example, PE devices 104, 106, 154, and 156 may all be configured with two L3 ports (e.g., SVI1 and SVI2), each SVI having its own L3 address (e.g., an IP Address). For example, SVI1 may have IP address (e.g., virtual IP address) of 10.0.0.1/24 and SVI2 may have IP address (e.g., virtual IP address) of 20.0.0.1/2, where each of SVI1 and SVI2 allows for the connection of hosts to respective specific subnet.

When host 108 desires to communicate with host 158, it may send a data packet to its gateway (e.g., SVI1 of PE 104, which is dedicated to the subnet of host 108). The data packet includes, as its destination IP address, the IP address of host 158. The default gateway of host 108 may be configured with the virtual address if SVI1, which is shared by all PE devices 104, 106, 154, and 156 that have SVI1.

When PE 104 receives that packet it routes the data packet (e.g., via L3 routing over the underlay) into the subnet of host 158 (e.g., subnet to which SVI2 is dedicated) and determines whether the address resolution table includes an entry (e.g., an IP-to-MAC binding) for the destination IP address (e.g., the IP address of host 158). If such binding is lacking, PE 104 generates an address resolution request message. The address resolution request message may be an address resolution protocol (ARP) request message or a neighbor discovery protocol (NDP) neighbor solicitation message. PE 104 may then broadcast the address resolution request message to each router and host to which it is connected (e.g., to PE 106 and GW PE 112). The address resolution message may be encapsulated in a Virtual Extensible Local Area Network (VXLAN) or multiprotocol label switching MPLS header and thus transmitted, within data center 102, via a VXLAN or MPLS tunnel.

Routers that receive the address resolution request message (e.g., PE 106 and GW PE 112) decapsulate the address resolution message and propagate the message to all the routers and hosts (e.g., host 110) to which they are connected. In addition, GW PE 112 may propagate the address resolution request message to GW PE 162 of data center 152. For example, the address resolution request may be flooded over available DCI links, including link 125.

GW PE 162 will receive the address resolution request message, encapsulate it, and flood it to other routers in data center 152 (e.g., to PEs 154 and 156). PEs 154 and 156 will further propagate the message (e.g., decapsulated message) to their connected hosts (e.g., hosts 158 and 160). The address resolution request message may be propagated by routers 162, 154, and 156 in data center 152 until the address resolution request message reaches host 158. In some embodiments (not shown), the address resolution request message may, instead, reach a router that has an entry for the destination IP address in its address resolution table and that is configured to operate as an address resolution proxy. The present disclosure will describe the host receiving the address resolution request message, but one skilled in the art will understand that the system will function similarly if the address resolution request message is handled by the address resolution proxy.

Host 158, upon receipt of the address resolution request message, will generate an address resolution reply message (e.g., an APR reply message or NDP neighbor advertisement message). The address resolution reply message will include, as its source IP and MAC addresses, the IP and MAC addresses of host 158. Address resolution request message will also include, as its destination IP and MAC addresses, the source IP and MAC addresses included in the address resolution request message. In this case, the source IP and MAC addresses included in the address resolution request message will be the virtual IP address and virtual MAC address shared by the SVI2, because SVI2 is dedicated to the subnet of host 158. Accordingly, host 158 will transmit the address resolution reply message to PE 154 via SVI2. In some embodiments, PE 154 may "consume" the address resolution reply message because it is configured with SVI which has the destination IP and MAC addresses included in the address resolution reply message. PE 154 may then store the IP-to-MAC binding of host 158 in its address resolution table, and generate a route advertisement (e.g., an EVPN update message) advertising a path to host 158. The EVPN update message may then be sent to all the routers with which it maintains an EVPN session (e.g., all routers in data center 152, including routers 156 and 162). However, such flooding may be limited to data center 152, because EVPN session is not maintained with routers in data center 102. This may cause PE 104 to never learn IP-to-MAC binding of host 158 and fail to send the data packet.

In one approach, this problem may be solved by routers (e.g., GW PE 162 and PE 154, and 156) flooding the address resolution reply message in the data plane. In this scenario, GW PE 162 will receive the address resolution reply message in the data plane and flood it to data center 102 via DCI link 125. However, this is an inefficient mechanism to propagate the IP-to-MAC binding across data centers, as it involves flooding the address resolution reply message throughout network 100. This may negate the advantages of the EVPN control plane. In addition, the problem gets worse as more data centers (not shown) are interconnected with each other. With a large number of hosts, such flooding of address resolution reply messages would result in significant waste of CPU, and networking resources, as every data center would receive unneeded address resolution reply messages.

To address this problem, GW PEs 162 and 112 may be configured to create and maintain a pending address resolution requests table (e.g., as shown in FIG. 4). Whenever GW PE 162 receives an address resolution request message via any DCI link (e.g., DCI Link 125), GW PE 162 may create an entry in the pending address resolution requests table. For example, in the present example, such an entry may include (a) the destination IP address included in the address resolution request message (e.g., IP address of host 158), (b) the source IP and MAC addresses included in the address resolution request message (e.g., virtual addresses of SVI2), an identifier of the DCI link via which the address resolution message was received (ID of DCI link 125), and a virtual local area network (VLAN) tag of the network of the data center (e.g., data center 102) of the source host (e.g., host 108).

The table may be used to better process an incoming route advertisement message. For example, when EVPN update message is received by GW PE 162, it may determine whether an IP address included in the route advertisement matches an IP address of some entry in the pending address resolution requests table. If so, GW PE 162 generates an address resolution reply message (e.g., a decapsulate or "naked" ARP reply message). The address resolution reply message may include, as its source IP and MAC addresses, the IP and MAC addresses included in the route advertisement (e.g., IP-to-MAC binding of host 158), and as its destination IP and MAC addresses, the source IP and MAC addresses of the address resolution request message (e.g., virtual IP and MAC addressed of SVI2). By referencing the table, GW PE 162 then transmits an address resolution reply message to the GW PE 112 via DCI link 125 (the DCI link on which the address resolution request message was received). This is possible because an identifier of the DCI link 125 is included in the pending address resolution requests table. The address resolution request message may also include the VLAN tag from the pending address resolution requests table. GW PE 162 may then delete the relevant entry from the pending address resolution requests table. Advantageously, if GW PE 162 receives an EVPN update message generated in data center 152, the table will lack a matching target IP address, and GW PE 162 will process such an advertisement as normal.

GW PE 112 will then receive the naked ARP and learn the IP-to-MAC binding of host 158 and create EVPN update messages for the routers of data center 102 (e.g., all routers that share an EVPN session in data center 102). In this way, PE 104 will eventually receive the EVPN update message with the needed IP-to-MAC binding for host 158 and will be able to transmit the data packets to host 158.

In some embodiments, there may be multiple outstanding address resolution requests for a particular IP address (e.g., requests from multiple data centers). In such embodiments, the pending address resolution requests table may include multiple entries for the same IP address. Alternatively, a single entry for the IP address may include a list of several values, each item in such a list may include a source IP and MAC addresses included in an address resolution request message for the particular IP address, an identifier of the DCI link via which that address resolution message was received, and a virtual local area network (VLAN) tag of the network of the data center from which that address resolution request message was received. When GW PE 162 receives a route advertisement including that IP address, the gateway router will generate address resolution reply messages for each of the pending requests for the target IP address and send such messages over multiple DCI interconnect routes (e.g., route 125 and other routes to other data centers).

The entries in the pending address resolution requests table of GW PE 162 may expire after a certain time period (e.g., 1 minute), after which time GW PE 162 may delete those entries. For example, if an address resolution request message is received by GW PE 162, it may generate an entry for that request in the table. If GW PE 162 fails to receive a route advertisement including the IP address included in the address resolution request message within a predetermined time (e.g., 1 minute), the entry will expire and be deleted.

Because the address resolution request message generated by PE 104 may be broadcast to all of the interconnected data centers (and not just to GW PE 162), gateway routers of the data centers that do not include the destination host (not shown) will receive the address resolution request message and generate an entry in their pending address resolution requests table for the requested IP address. Those entries will eventually expire when a route advertisement having the requested IP address is not received, and thus the pending address resolution requests table will not indefinitely maintain entries for address resolution request messages that are destined for hosts in other data centers.

Figure 2A:
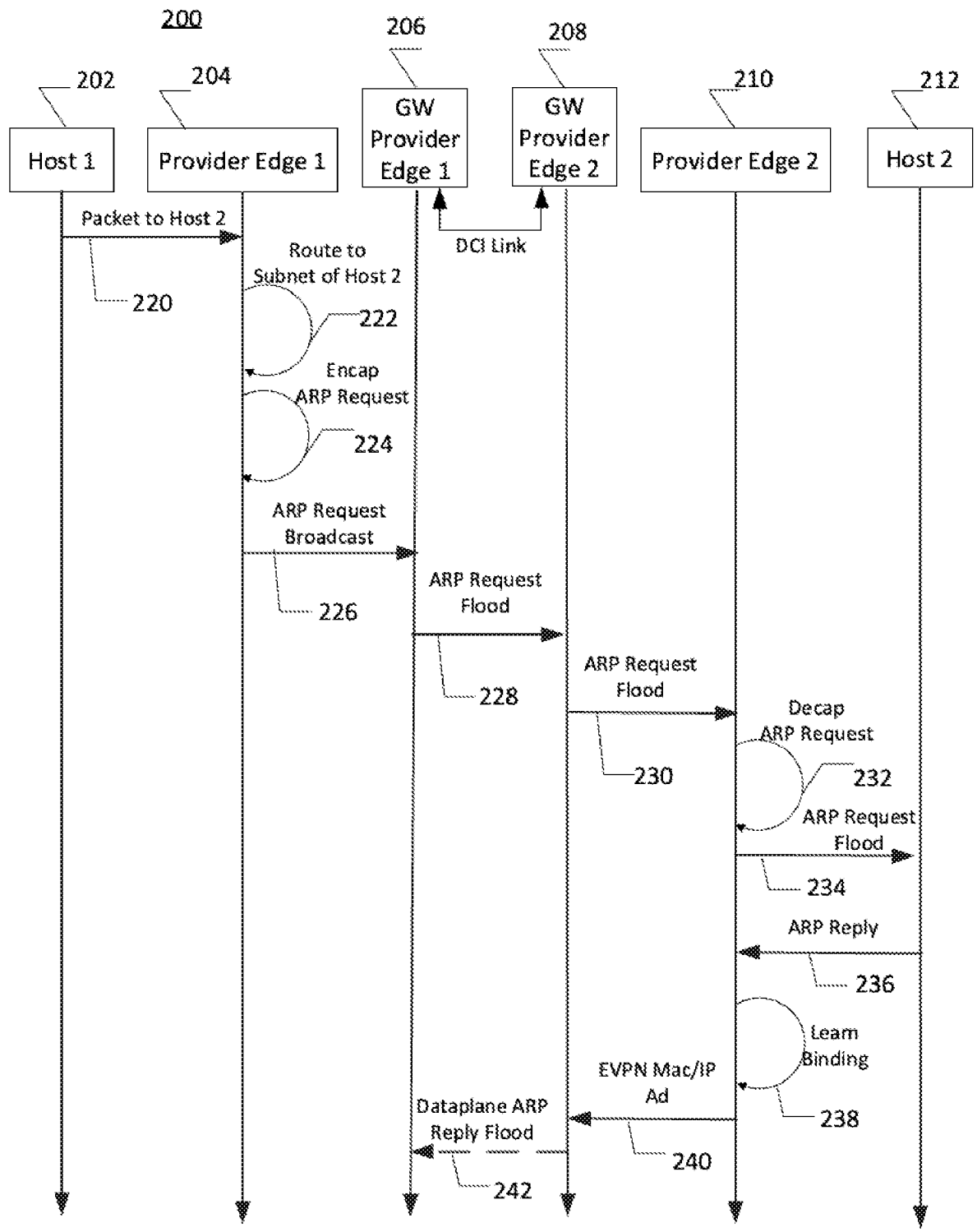
FIG. 2A is a flowchart of an illustrative process for propagation of an ARP entry, in accordance with some embodiments of the present disclosure.

FIG. 2A is a flowchart of an illustrative process for propagation of an ARP entry, e.g., in routing architecture 200 (e.g., as illustrated by system 100 of FIG. 1). While the method is described for propagation of an ARP entry, one skilled in the art will understand that other types of address resolution request messages (e.g., NDP neighbor solicitation message) may be handled in a similar fashion.

In some embodiments, the propagation may involve hosts 202 and 212 (which may be the same as hosts 108 and 158), Provider Edges 204 and 210 (which may be the same as PEs 104 and 154) and Gatewayed Provider edges 206 and 208 (which may be the same as GE PEs 112 and 162). In some embodiments, Provider Edges 204 and 210 may include one or more SVIs for connection to host 202 and 212. Each such SVI may have a shared VIP address and shared virtual MAC address for servicing a respective subnet. Hosts 202 and 212 may be parts of different subnet serviced by different SVIs. In some embodiments, one EVPN session may be maintained for host 202, PE 204, and GW PE 206 (e.g., because the devices are in a single data center) and another EVPN session may maintained for host 212, PE 210, and GW PE 208. GW PEs 206 and 208 may be connected by a DCI interconnect link.

At 220, host 202 may sent a packet (e.g. a ping) to host 212. A host may use a default gateway configured with the virtual address of SVI1 of PE 204 to send the packet. At 222, PE 204 may route the packet to correct subnet (e.g., one serviced by SVI2). PE 204 may discover that it lacks ARP binding for host 212 in its ARP table. In this case, at 224, PE 204 generates an ARP message, encapsulates it and broadcasts it, at step 226, to the local data center and remote data centers. For example, the ARP request will be sent in VxLAN/MPLS tunnel by PE 204 to GW PE 206. For example, at step 228, GW PE 206 may flood the ARP request to GW PE 208 over DCI link (e.g., in decapsulated form), among other devices.

At 230, GW PE 208 may further flood the ARP request message (e.g., in encapsulated form) until it reaches PE 210.

PE 210 may, at step 234, further flood the ARP request message to host 212 (e.g., after decapsulation at step 232). Once host 212 receives the ARP request message, it may create and send an ARP reply message 236. The ARP reply message may be sent to PE 210, which has an SVI that shares a virtual address with the SVI of PE 204. For this reason, PE 210 may, at step 238, consume the ARP reply message and learn the IP-to-MAC binding of host 212 in the ARP reply message.

At step 240, PE 210 may generate an EVPN MAC/IP advertisement and propagate it to all router devices it maintains EVPN sessions with (e.g., to GW PE 208). However, since the EVPN session does not span across the data centers, devices 206 and 204 will not receive the EVPN MAC/IP advertisement for host 212.

In some embodiments, to overcome this problem, every router (including GW PE 208) may also flood the ARP reply in the data plane, at step 242. In this way, the ARP reply will eventually reach PE 204 and allow it to forward the packet received at step 220. However, such an ARP reply will tie up a lot of resources of network 200.

Figure 2B:
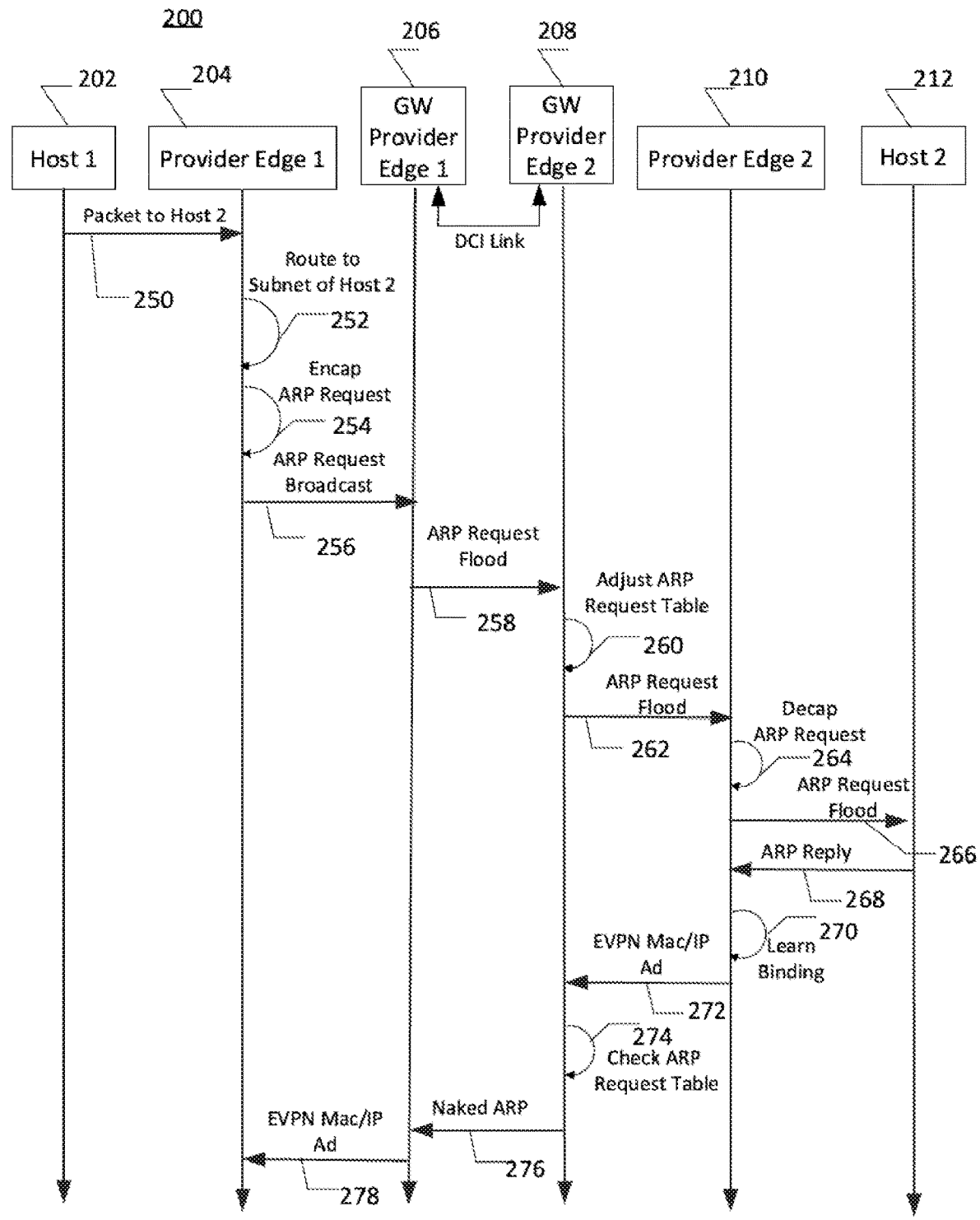
FIG. 2B is a flowchart of another illustrative process for propagation of an ARP entry, in accordance with some embodiments of the present disclosure.

FIG. 2B is another flowchart of an illustrative process for propagation of ARP entry, e.g., in routing architecture 200 (e.g., as illustrated by system 100 of FIG. 1) which provides an improvement over the method described by FIG. 2A. In some embodiments, FIG. 2B illustrates the same network 200 as shown by FIG. 2A and includes the same devices 202-212.

In some embodiments, steps 250, 252, 254, 256, and 258 may be exactly the same as respective steps 220, 222, 224, 226 and 228 of FIG. 2A. However, upon receipt of an ARP request at step 258 (which is equivalent to step 228), GW PE 208 will behave differently.

In particular, at step 260, GW PE 208 will adjust a specially created pending ARP request table. In some embodiments, all gateway provider edges of the network 200 may maintain such a table. An exemplary pending ARP request table 400 is illustrated in FIG. 4. Such tables may be used to track all ARP requests that are received via DCI interconnect. As shown in FIG. 4, the ARP request table 400 may include entries (e.g., rows) for each target IP Address. For example, at step 260, GW PE 208 may create a row (e.g., row 1 of table 400) based on the received pending ARP request. In this case, that row includes an entry listing IP address of host 212. The row may further include an entry for the source IP address and an entry for the source MAC address. These addresses may be virtual addresses of an SVI of PE 204 that generated the ARP request. The row may also include an entry for identifying the Ingress L2 DCI interconnect link (e.g., link 125). Finally, the row may further include the virtual local area network (VLAN) tag of the network of the data center from which that address resolution request message was received. This tag may include a VxLAN network identifier (VNI) of the session maintained between devices 202, 204, and 206. While the data in FIG. 4 is shown as a table, the data in each row may, alternatively, be stored as a tuple in any kind of data structure.

At 262, GW PE 208 may flood the ARP request as normal (e.g., as explained in step 230). At 264, PE 210 may decapsulate the ARP message and flood it to hosts (including host 212) at step 266. At 268, host 212 may generate an ARP reply message (that includes IP-to-MAC binding of host 212) and send it to PE 210 (e.g. via SVI1 of the subnet of host 212). PE 210 will consume the ARP message and learn the included binding at step 270. At step 272, PE 210 will send a route advertisement (e.g., EVPN MAC/IP advertisement) to all the routers with which it maintains an EVPN session, including GW PE 208.

At 274, GW PE 208 will receive the route advertisement and reference the pending ARP request table 400 as illustrated in FIG. 4. As described above, the table will include an entry (e.g., a row) for the target IP address of host 212. GW PE 208 will search and find this entry using the IP address from the IP-to-MAC binding of the EVPN MAC/IP advertisement. Once the entry is identified (e.g., by searching row 1 of the table, which acts as the key row), GW PE 208 will generate a new ARP reply message that will include: the following fields as shown in Table 1:

TABLE 1

(Fields of ARP reply message)

| | |
|---|---|
| ARP header source IP | Set to the 'target IP' field from row 1 of the pending ARP request table 400 |
| ARP header source MAC | Set to the MAC address in EVPN MAC/IP path from the EVPN MAC/IP advertisement |
| ARP header target IP | Set to the 'source IP' field from row 1 of the pending ARP request table 400 |
| ARP header target MAC | Set to the 'source MAC' field from row 1 of the pending ARP request table 400 |
| Ethernet header 801.1Q tag | Set to the 'VLAN tag' field from row 1 of the pending ARP request table 400 |

This ARP reply packet may then be sent a naked (e.g., decapsulated) ARP reply message over the Ingress L2 DCI interconnect link (e.g., link 125) identified by row 1 of the pending ARP request table 400 (e.g., DCI link between GW Pes 206 and 208) at step 276. Row 1 may then be deleted.

GW PE 206 will then learn the ARP binding from the ARP reply packet and generate a route advertisement (e.g., EVPN MAC/IP advertisement) to be sent, at step 278, to all routers of its EVPN session (including PE 204). Once PE 204 receives the EVPN MAC/IP advertisement, it will be able to forward the packet received at step 250. This allows for communication between host 202 and host 212 without the need for ARP reply data plane flooding, thereby increasing the performance of network 200.

Figure 3:
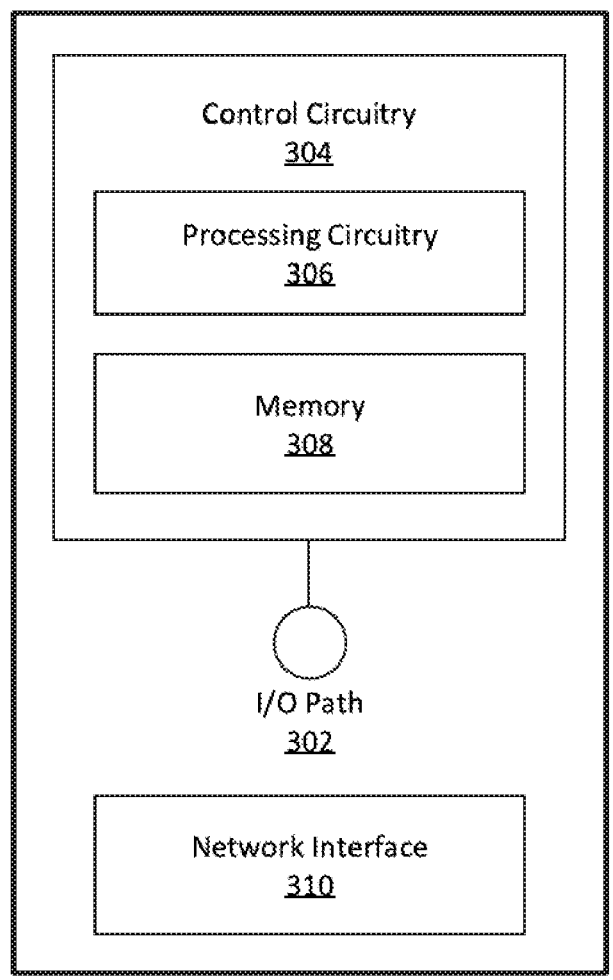
FIG. 3 shows a diagram of an illustrative network device for synchronization of an ARP binding, in accordance with some embodiments of the disclosure.

FIG. 3 shows a generalized embodiment of a network device usable in a system for propagation of ARP bindings, in accordance with some embodiments of the disclosure. In particular, device 300 of FIG. 3 may be any of the devices depicted in FIGS. 1 and 2 (e.g., devices 108, 110, 104, 106, 112, 162, 154, 156, 158, 160, and 202-212) or may a physical or virtual device hosting any of physical or virtual devices 108, 110, 104, 106, 112, 162, 154, 156, 158, 160, and 202-212. Device 300 may be a router, an L3 switch, an L2 router, or a host, and/or any other computing device that may be configured to participate in propagation of ARP bindings. Device 300 may receive data at network interfaces 310 and provide the received data to control circuitry 304 via an input/output (I/O) path 302. Control circuitry 304 includes processing circuitry 306 and storage 308. Storage 308 may include volatile memory 330 (such as random-access memory (RAM), for example, static RAM and/or dynamic RAM), which does not retain its contents when power is turned off, and non-volatile memory 332 (such as, for example, a solid state drive (SSD), a hard disk drive (HDD), electrically erasable programmable read-only memory (EEPROM), etc.), which does retain its contents when power is turned off. Control circuitry 304 may send and receive commands, requests, and other suitable data using I/O path 302. As noted above, I/O path 302 connects control circuitry 304 (and specifically processing circuitry 306) to network interface 310, which in turn connect device 300 to one or more other devices. For example, I/O path 302 may propagate ARP replies to learn IP-to-MAC binding.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions suitable to implement any of the techniques described above or below.

Storage 308 may be an electronic storage device that is part of control circuitry 304. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 308 may include and address resolution table, a neighbor discovery protocol table, and a MAC table, and pending address resolution requests table (e.g., table 400 of FIG. 4). Multiple circuits may be provided to handle simultaneous processing functions. In some embodiments, device 300 may be a virtual device, wherein components 304, 306, 308, 302 and 310 are virialized on top of another physical device.

FIG. 4 depicts a diagram of an illustrative pending address resolution requests table 400, in accordance with some embodiments of the present disclosure. In some embodiments, table 400 may be used by GW PE 208 of FIG. 2B to provide ARP replies to devices that do not share an EVPN session with GW PE 208.

In some embodiments, the table includes tuples (e.g., shown as rows) for each ARP request received over a DCI link. Each tuple (e.g., each row) may include values for: target IP address (which acts as the key), source IP address, source MAC address, ingress L2 DCI port identifier, and VLAN tag. A GW PE may access the table every time it receives a route advertisement (e.g., EVPN MAC/IP advertisement). When EVPN MAC/IP advertisement is received, a GW PE may reference the table (e.g., column 1 of the table) to find an IP address that matches an IP address from the binding in the EVPN MAC/IP advertisement. If the binding is found, an ARP reply is generated (e.g., as shown in Table 1) and sent via the L2 DCI port identified in column 4 of table 400.

In some embodiments, an IP address may occur more than once in table 400. Alternatively, entries in columns 2-5 may include multiple values (e.g., multiple source IP and MAC addresses, multiple DCI identifiers, and multiple VLAN tags). In such embodiments, an ARP reply messages may be generated and sent via more than one DCI link (e.g., once for each occurrence of IP address in column 1, or once for each of the multiple values associated with the IP address of column 1).

In some embodiments, rows of table 400 may have creation time stamps, and may be deleted after certain amount of time has elapsed after the time identified by the respective creation time stamp.

Figure 5:
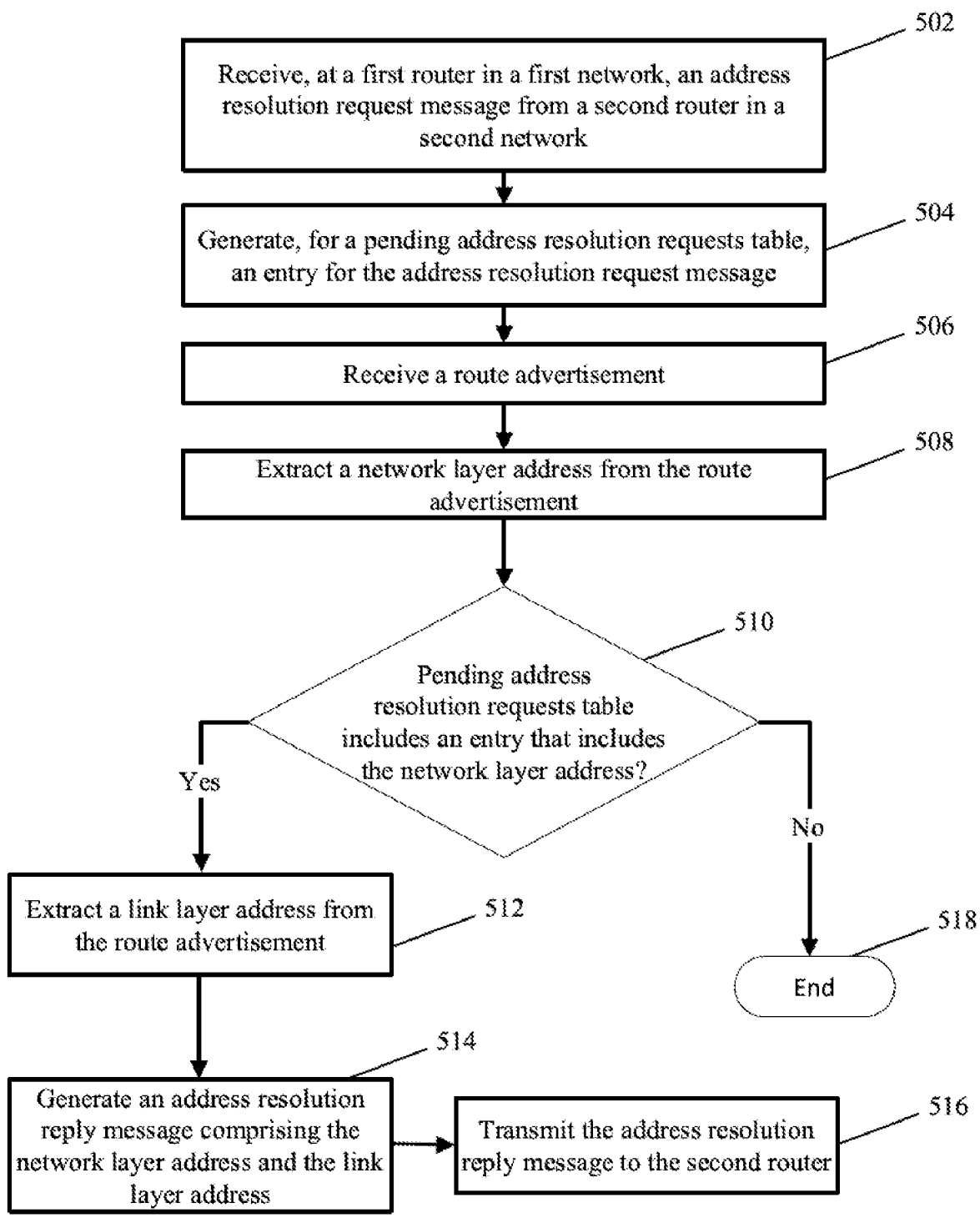
FIG. 5 is another flowchart of an illustrative process for propagation of an ARP entry, in accordance with some embodiments of the present disclosure.

FIG. 5 is a flowchart of a detailed illustrative process for propagation of ARP binding, in accordance with some embodiments of the present disclosure. Process 500 may be performed by physical or virtual control circuitry, such as control circuitry 304 of device 300 (FIG. 3). For example, process 500 may be performed by control circuitry of GW PE 208 of FIG. 2B. In some embodiments, the control circuitry performs process 500 in response to receiving an address resolution protocol (ARP) message as part of step 258 of FIG. 2B.

At 502, the control circuitry of the first router (e.g., GW PE 208) receives, in a first network (e.g., EVPN session in a first data center), an address resolution request message from a second router (e.g., GW PE 206) in a second network (e.g., EVPN session in a second data center).

At 504, the control circuitry generates, for a pending address resolution requests table (e.g., Table 4 of FIG. 4), an entry for the address resolution request message. For example, the entry may include a tuple of {target network layer address, source network layer address, source link layer address, ingress link layer DCI port, VLAN tag}. The generation of such a tuple is described in more detail at step 260 of FIG. 2B.

At 506, the control circuitry may receive a route advertisement (e.g., a route advertisement that was caused by propagation of the address resolution request message by the first router). At 508, the control circuitry may extract a network layer address from the route advertisement (e.g., the control circuitry may extract IP address from the MAC/IP binding of the route advertisement).

At 510, the control circuitry may check if the pending address resolution requests table (e.g., Table 400) includes an entry including the network layer address extracted at step 508 (e.g., by searching Column 1 of table 400). If the network layer address is not found, process 500 ends at step 518. Otherwise process 500 proceeds to 512.

At 512, the control circuitry may extract a link layer address from the route advertisement (e.g., the MAC Address from the row that was matched based on the network layer address may be extracted). At 514, the control circuitry may generate an address resolution reply message comprising the network layer address and the link layer address (e.g., as shown in Table 1 above). At 516, the control circuitry may use a communication circuity to transmit the address resolution reply message to the second router (e.g., via extracted Link Layer DCI port from the matching row of the pending address resolution requests table).

Figure 6:
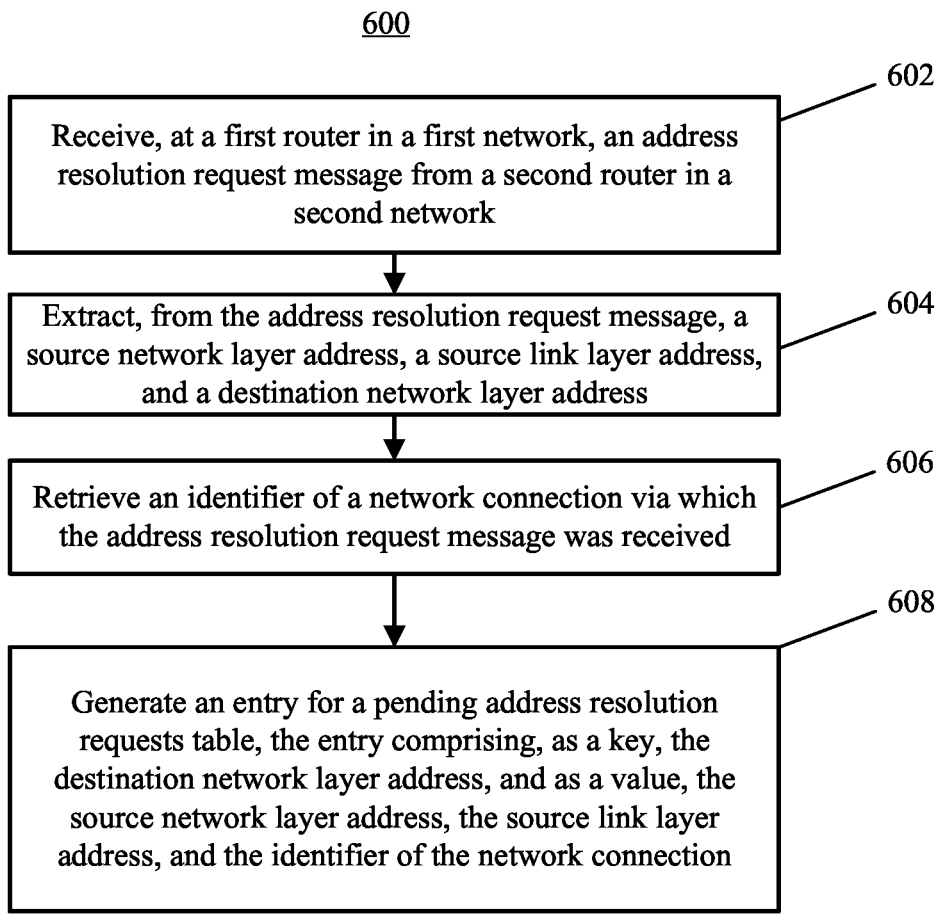
FIG. 6 is another flowchart of an illustrative process for propagation of an ARP entry, in accordance with some embodiments of the present disclosure.

FIG. 6 is a flowchart of another detailed illustrative process for propagation of ARP binding, in accordance with some embodiments of the present disclosure. Process 600 may be performed by physical or virtual control circuitry, such as control circuitry 304 of device 300 (FIG. 3). For example, process 600 may be performed by control circuitry of GW PE 208 of FIG. 2B. In some embodiments, the control circuitry performs process 600 in response to receiving an address resolution protocol (ARP) message as part of step 258 of FIG. 2B.

At 602, the control circuitry of the first router (e.g., GW PE 208) receives, in a first network (e.g., EVPN session in a first data center), an address resolution request message from a second router (e.g., GW PE 206) in a second network (e.g., EVPN session in a second data center).

At 604, the control circuitry extracts, from the address resolution request message, a source network layer address, a source link layer address, and a destination network layer address. At 606, the control circuitry may also retrieve an identifier of a network connection via which the address resolution request message was received (e.g., DCI interconnect 125).

At 608, the control circuitry may generate an entry for a pending address resolution requests table, the entry comprising, as a key, the destination network layer address, and as a value, the source network layer address, the source link layer address, and the identifier of the network connection. For example, pending address resolution requests table may be Table 400 of FIG. 4, where the first column is used as the key, and the other values of each column of a particular row are associated with the key in column 1 of the respective row. In some embodiments, the entry may also include a virtual network identifier extracted from an ethernet frame comprising at least a portion of the address resolution request message (e.g., an identified VNI of EVPN session in data center 102). In some embodiments, this extracted VNI may be stored in row 5 of of table 400.

In some embodiments, steps 602-608 may be repeated for other incoming address resolution request messages. In this case, more and more entries will be added to the pending address resolution requests table (e.g., more rows may be added to table 400). In some embodiments, instead of adding a new entry (e.g., row), an existing entry (e.g., row) may be changed, if a new incoming address resolution request message has the same destination network layer address. For example, the existing entry (e.g., row) may be changed to add additional values to columns 2-5 of Table 400. In this way, every destination network layer address (acting as a key) may have multiple values for source network layer address, source link layer address, identifier of a network connection via which the address resolution request message was received, and virtual network identifier.

Figure 7:
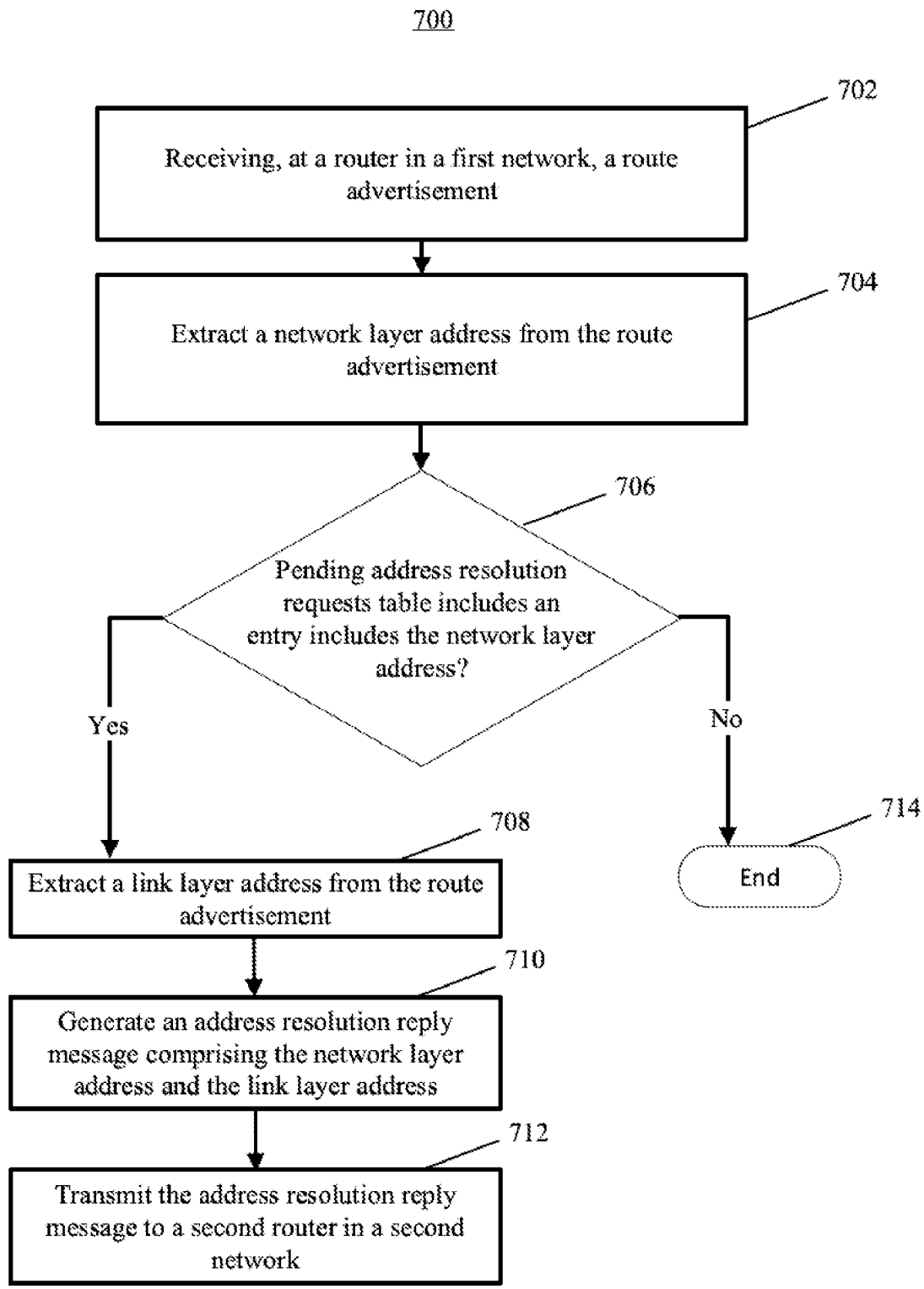
FIG. 7 is another flowchart of an illustrative process for propagation of an ARP entry, in accordance with some embodiments of the present disclosure.

FIG. 7 is a flowchart of a detailed illustrative process for propagation of ARP binding, in accordance with some embodiments of the present disclosure. Process 700 may be performed by physical or virtual control circuitry, such as control circuitry 304 of device 300 (FIG. 3). For example, process 700 may be performed by control circuitry of GW PE 208 of FIG. 2B. In some embodiments, the control circuitry performs process 700 in response to receiving a route advertisement as part of step 272 of FIG. 2B.

At 702, the control circuitry of the first router (e.g., GW PE 208), receives a route advertisement (e.g., an EVPN MAC/IP advertisement). For example, this may occur after a pending address resolution requests table was modified as part of FIG. 5 or 6. At 704, the control circuitry may extract a network layer address from the route advertisement (e.g., IP address from the MAC/IP binding).

At 706, the control circuitry may check whether the pending address resolution requests table (e.g., table 400 of FIG. 4) includes an entry including the network layer address. If no such entry is found, process 700 may end at block 714, and no further special action is need other than regular processing of EVPN MAC/IP advertisements. If a matching entry is found, process 700 proceeds to 708.

At 708, the control circuitry extracts a link layer address from the route advertisement. For example, the MAC address may be extracted from the EVPN MAC/IP advertisement. At 710, the control circuitry may generate an address resolution reply message comprising the network layer address and the link layer address. For example, the address resolution reply message may construct as outlined in Table 1. At 712, the control circuitry, using communication circuitry, transmits the address resolution reply message to a second router in a second network (e.g. using DCI link identified from Table 400). In some embodiments, if the pending address resolution requests table includes an identifier of a third network, more than one address resolution reply message may be constructed and sent. In some embodiments, if more than one matching entry is found, more than one address resolution reply message may be constructed and sent. In some embodiments, all matching entries may be deleted once address resolution reply messages are sent.

Figure 8:
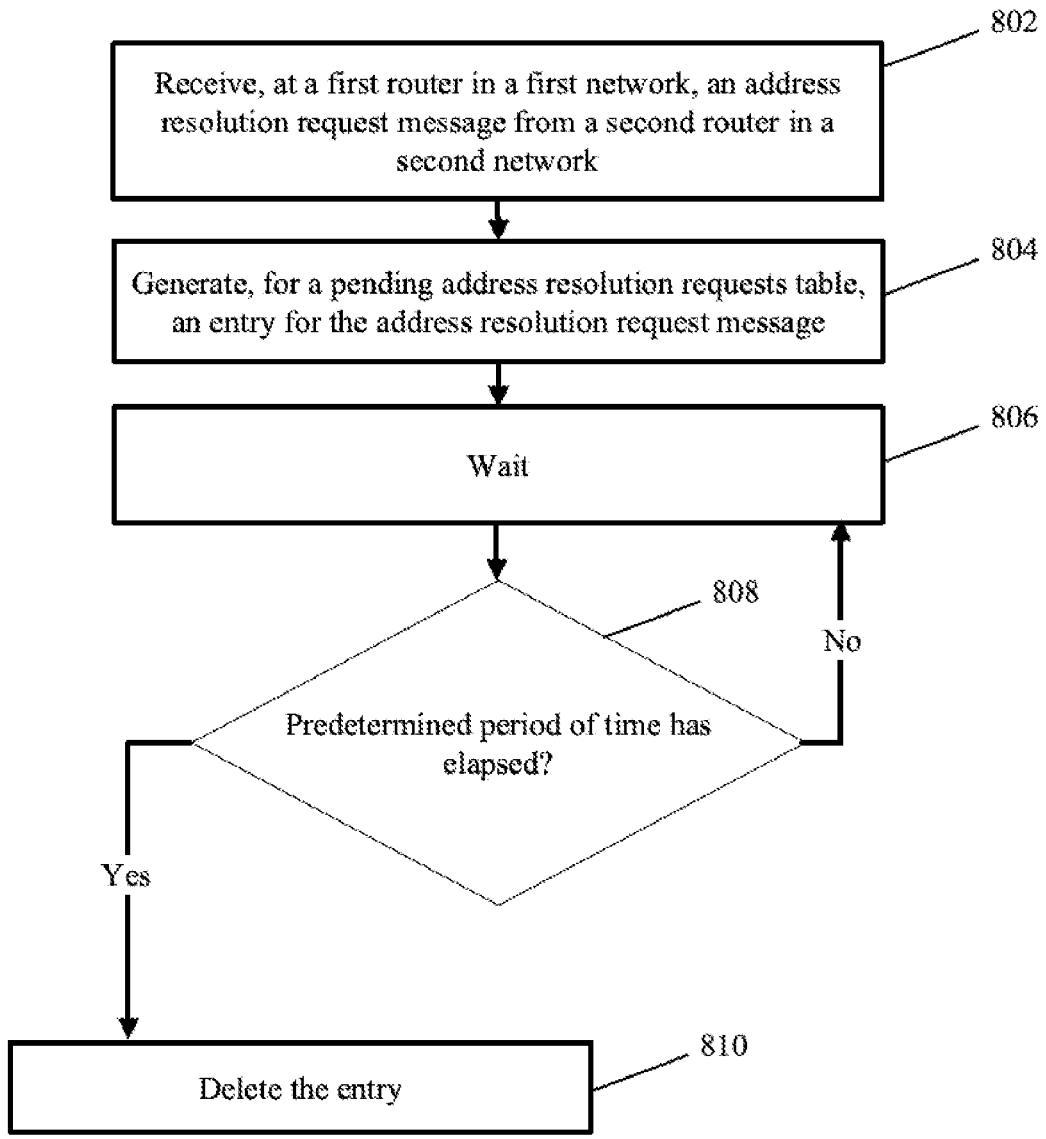
FIG. 8 is yet another flowchart of an illustrative process for propagation of an ARP entry, in accordance with some embodiments of the present disclosure.

FIG. 8 is a flowchart of a detailed illustrative process for propagation of ARP binding, in accordance with some embodiments of the present disclosure. Process 800 may be performed by physical or virtual control circuitry, such as control circuitry 304 of device 300 (FIG. 3). For example, process 800 may be performed by control circuitry of GW PE 208 of FIG. 2B. In some embodiments, the control circuitry performs process 800 in response to receiving an address resolution protocol (ARP) message as part of step 258 of FIG. 2B, after generating a new entry for table as described in FIGS. 5 and 6.

At 802, the control circuitry of the first router (e.g., GW PE 208), receives an address resolution request message from a second router in a second network. At 804, the control circuitry generates, for a pending address resolution requests table, an entry for the address resolution request message. For example, an entry is generated as described in Table 1.

At 806, the control circuitry may wait for a certain period of time (e.g., 30 seconds). At 808, the control circuitry may check if a predetermined period of time (e.g., 1 minute) has elapsed. If not, the control circuitry may return to step 806 and continue waiting. If the predetermined period of time has elapsed, the control circuitry at step 810, deletes the entry generated at step 804. Such a deletion may be important, since the ARP request may have been flooded to multiple GW PEs that do not include a target host. In this way, the pending address resolution requests table will not grow indefinitely.

While the processes 500, 600, 700, and 800 described above illustrate a single iteration of the operations of devices to affect ARP distribution, those skilled in the art will appreciate that these processes may be iteratively repeated to distribute multiple ARP reply messages. The processes 400, 500, 600, 700, and 800 described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method for providing address resolution reply messages, the method comprising:
    receiving, at a first router in a first network, an address resolution request message from a second router in a second network via a layer 2 data center interconnect link;
    generating, for a pending address resolution requests table, an entry for the address resolution request message, the entry including an identifier of the layer 2 data center interconnect link;
    receiving a route advertisement;
    extracting a network layer address from the route advertisement;
    determining the pending address resolution requests table includes an entry including the network layer address; and
    in response to determining that the pending address resolution requests table includes an entry including the network layer address:
        extracting a link layer address from the route advertisement;
        generating an address resolution reply message, of the address resolution reply messages, comprising the network layer address and the link layer address; and
        sending the address resolution reply message to the second router via the layer 2 data center interconnect link.

2. The method of claim 1, further comprising deleting the entry.

3. The method of claim 1, further comprising:
    determining a period of time has elapsed since the address resolution request message was received; and
    in response to determining that the predetermined period of time has elapsed, deleting the entry.

4. The method of claim 1, further comprising:
    determining the entry includes an identifier of a third network; and
    in response to determining that the entry includes the identifier of the third network, sending the address resolution reply message to a third router in the third network.

5. The method of claim 1, wherein the address resolution request message is one of an address resolution protocol (ARP) request message and a neighbor discovery protocol (NDP) neighbor solicitation message.

6. The method of claim 1, wherein the address resolution reply message is an ARP reply message.

7. The method of claim 1, wherein the first router and the second router do not maintain a joint ethernet virtual private network (EVPN) connection and are gateway provider edge devices.

8. The method of claim 1, wherein the link layer address is a media access control (MAC) address and the network layer address is an Internet Protocol (IP) address.

9. The method of claim 1, wherein the layer 2 data center interconnect link is a layer 2 data center interconnect trunk line.

10. A method for converting address resolution reply messages to control plane route advertisements, the method comprising:
    receiving, from a router through a layer 2 data center interconnect link, an address resolution reply message of the address resolution reply messages, the address resolution reply message being responsive to an address resolution request message from a host in a network, the network comprising network devices communicatively coupled to each other in a control plane;
    extracting, from the address resolution reply message, a network layer address and a link layer address;
    generating a control plane route advertisement of the control plane route advertisements based on the extracted network layer address and link layer address; and
    providing the control plane route advertisement to the network devices through the control plane.

11. The method of claim 10, wherein the control plane is an Ethernet Virtual Private Network (EVPN).

12. The method of claim 10, wherein the address resolution request message is one of an address resolution protocol (ARP) request message and a neighbor discovery protocol (NDP) neighbor solicitation message.

13. The method of claim 10, wherein the address resolution reply message is an ARP reply message.

14. The method of claim 10, wherein the address resolution reply message is unencapsulated.

15. The method of claim 10, wherein the link layer address is a media access control (MAC) address, and the network layer address is an Internet Protocol (IP) address.

16. A router comprising:
    a processor; and
    a memory communicatively coupled to the processor, the memory storing instructions executable by the processor to perform a method for converting address resolution reply messages to control plane route advertisements, the method comprising:
        receiving, from another router through a layer 2 data center interconnect link, an address resolution reply message of the address resolution reply messages, the address resolution reply message being responsive to an address resolution request message from a host in a network, the network comprising network devices communicatively coupled to each other in a control plane;
        extracting, from the address resolution reply message, a network layer address and a link layer address;
        generating a control plane route advertisement of the control plane route advertisements based on the extracted network layer address and link layer address; and
        providing the control plane route advertisement to the network devices through the control plane.

17. The router of claim 16, wherein the router and the another router do not maintain a joint ethernet virtual private network (EVPN) connection and are gateway provider edge devices.

18. The router of claim 16, wherein the control plane is an Ethernet Virtual Private Network (EVPN).

19. The router of claim 16, wherein the address resolution request message is one of an address resolution protocol (ARP) request message and a neighbor discovery protocol (NDP) neighbor solicitation message.

20. The router of claim 16, wherein the layer 2 data center interconnect link is a layer 2 data center interconnect trunk line.

\* \* \* \* \*